Figure 1:
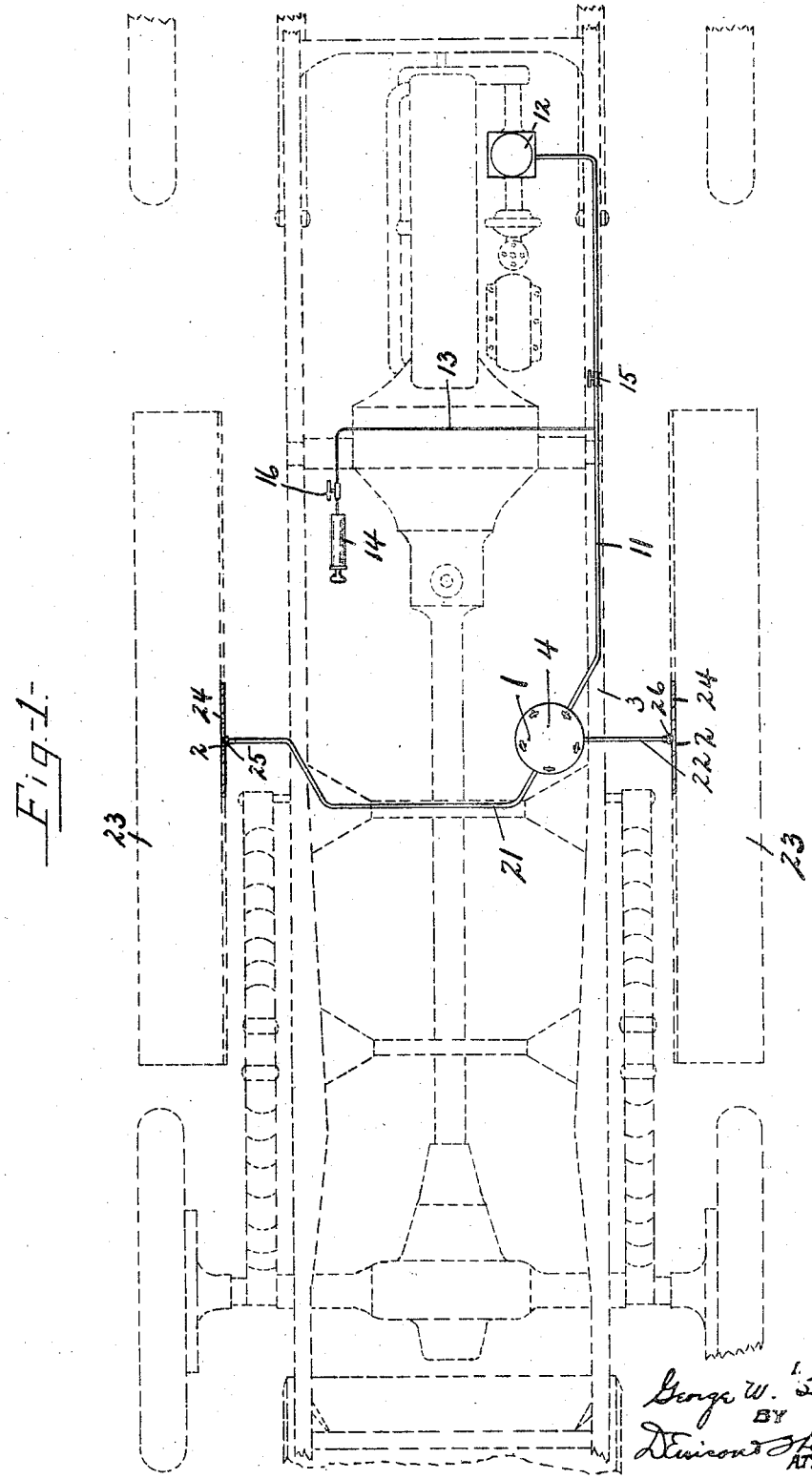
Figure 2:
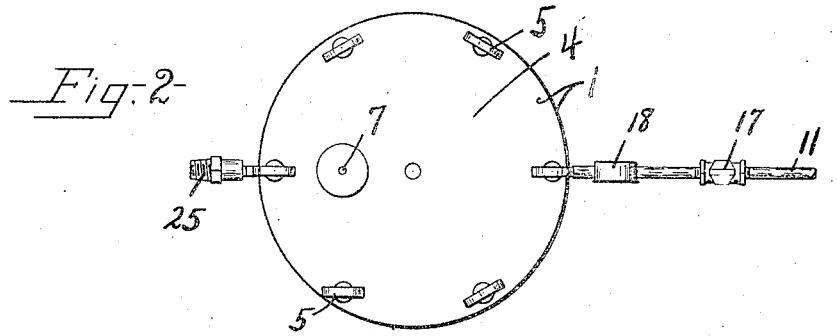
Figure 3:
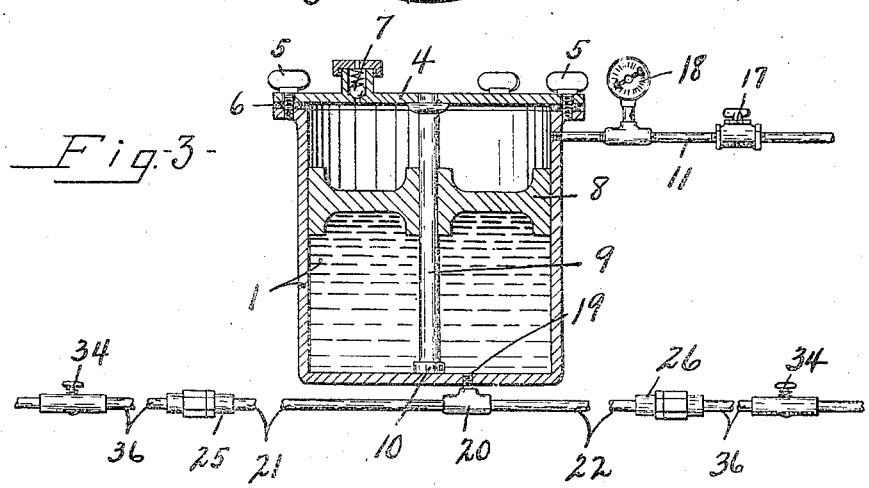
Figure 4:
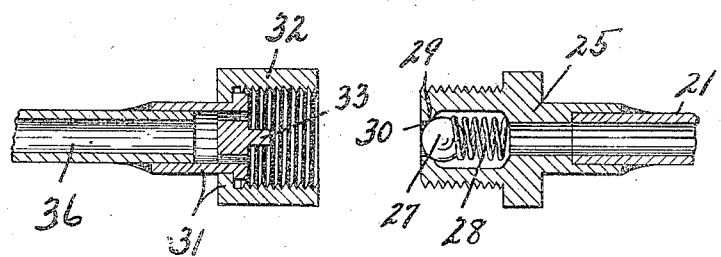

Sept. 23, 1924.                  1,509,180
G. W. SEVERSON
LUBRICATING SYSTEM
Filed May 19, 1920          2 Sheets-Sheet 2

Patented Sept. 23, 1924.

1,509,180

UNITED STATES PATENT OFFICE.

GEORGE W. SEVERSON, OF AUBURN, NEW YORK, ASSIGNOR TO BOWEN PRODUCTS CORPORATION, OF AUBURN, NEW YORK, A CORPORATION OF NEW YORK.

LUBRICATING SYSTEM.

Application filed May 19, 1920. Serial No. 382,584.

*To all whom it may concern:*

Be it known that I, GEORGE W. SEVERSON, of Auburn, in the county of Cayuga, in the State of New York, have invented new and useful Improvements in Lubricating Systems, of which the following, taken in connection with the accompanying drawings, is a full, clear, and exact description.

This invention relates to certain improvements in lubricating system, and, more particularly, to a lubricating system as applied to vehicles, such as automobiles, etc.

The primary object of the invention is to provide a constantly available, readily accessible and efficient means for supplying lubricant under pressure to the parts of the apparatus to be lubricated, and, for this purpose, I have provided an apparatus preferably constituting an automobile accessory adapted to be secured to the frame or other portion and constitute a more or less permanent portion of the equipment of the vehicle, and so arranged and connected as to utilize if desirable other regular equipment of the vehicle for producing the required pressure to force the lubricant from its containing means through suitable valved conveyors, terminating at readily accessible points to a conduit adapted to be connected to said conveyors and having a discharge orifice or nozzle for supplying the lubricant to the bearing, grease cup or other receiving or containing device.

Other objects relate to the details of form, construction and operation of the apparatus, as will more fully appear from the following description taken in connection with the accompanying drawings in which Figure —1— is a top plan view of my lubricating system installed upon an automobile indicated partially by dotted lines.

Figure —2— is a top plan view of the lubricant containing tank.

Figure —3— is a vertical sectional view through the lubricating containing tank.

Figure —4— is a sectional view of the coupling members for uniting the conduits connecting with the lubricant containing tanks, with a tube, such as a flexible metallic hose, adapted to convey the lubricant to bearings, etc.

As illustrative in Figure —1— the lubricant containing receptacle tank is preferably hung from the vehicle beneath the body or floor board of same at a point somewhere near the longitudinal center of the vehicle and for the purpose of supporting the tank it may be secured by clamps or other well known mechanical devices to a portion of the frame of the vehicle, as, for instance, the longitudinal side bar —3—, as the particular installing mechanic may desire. It will be understood, however, that the tank may be mounted on the vehicle in any manner desired and at any point desired in accordance with the circumstances of each individual case, the positioning shown being merely illustrative of a suitable arrangement in accordance with my present information. The tank —1— is preferably open at its top and provided with a removable cover —4—, adapted to be secured to the upper end of the tank in any suitable way as by thumb screws —5—, an air tight connection being assured between the parts by the interposition of a gasket —6— of suitable material. The cover may be provided with a relief valve —7—, operating to relieve excess pressure above any predetermined amount. Within the tank —1— is positioned a plunger —8— fitting tightly within the interior of the tank and provided with packing if that should be desirable. The plunger is mounted upon a vertically arranged rod —9— having its upper end secured to the cover —4— and its lower end headed at —10— to prevent the plunger from sliding off the lower end of rod when the rod is withdrawn from the tank. This construction results in the withdrawal of the plunger —8— in conjunction with the rod —9— and cover —4— when it is desirable to fill the tank with lubricant.

The pipe —11— penetrates the upper end of the tank —1— and connects at its opposite end with any suitable source of fluid pressure, and preferably in such vehicle installations as embody a tire pump —12— the pipe —11— is connected to the pump so that air pressure may be produced in the upper portion of tank —1— by the operation of the tire pump. In addition, the pipe —11— may be connected as by branch —13— or otherwise to the hand pump —14— adapted to be installed at a convenient place upon the vehicle for hand operation. Valves —15— and —16— are provided in the respective pipes to prevent back flow of fluid into the one source of pressure, when the other source is being used for operation of the lubricating system. Pipe —11— may in addition be provided with a shut-off valve —17— and a pressure gauge —18.

The tank —1— is further provided with an opening —19— in its bottom wall into which is screwed one end of a three way union —20—, the other two ends of the union being connected respectively to conduits —21— and —22—. These conduits preferably extend to and terminate adjacent to the opposite sides of the vehicle body, preferably at points adjacent the longitudinal center of the running boards —23— and for this purpose the vertical side walls —24— extending between the running board —23— and the vehicle body are provided with openings —2— and the pipes —21— and —22— terminate adjacent these openings and are accessible here through and may even extend into or through the openings and terminate in nions —25— and —26— of similar construc n, and containing a normally closed valve and, as illustrative of a suitable construction for this purpose I have shown the union as externally threaded and formed with an internal chamber containing a ball —27— pressed by spring —28— against the valve seat —29— surrounding the discharge opening —30— leading from the coupling.

The apparatus so far described constitutes the portion mounted upon and preferably forming regular equipment of the vehicle. In connection the operator will use preferably a length of flexible metal hose —36— sufficiently long to reach all of the portions upon one side of the car. This hose may terminate in any form of nozzle, union or other connecting device for operably supplying the lubricant to the bearing, grease cup, etc. That connection constitutes no part of the present invention.

The other end of the metallic hose adapted for connection to the coupling —25— is formed with a coupling —31— embodying a rotary union —32— internally threaded for engagement with the externally threaded portion of the union —25—. Coupling —31— is further provided with a centrally projecting pin —33— adapted when union —32— is threaded upon coupling —25— to connect the ball —27— and force it from its seat against the action of the spring —28— to permit the flow of lubricant through the discharge orifice —30—. The lubricant will then travel along the metal hose to the valve —34— which may be of any suitable construction, preferably operated by pressure upon the head of the valve stem. This valve may be positioned near the discharge end of the flexible hose —36— so that by merely pressing upon the head of the valve stem the operator permits the passage of lubricant to the discharge orifice through the metallic hose for supply to parts to be lubricated.

The construction and operation of the device will be readily understood from the above description taken in connection with the drawing, and although I have shown and described a specific construction, form, arrangement and position of the apparatus with relation to the vehicle, I do not desire to limit myself to the same, as various changes and modifications may be made in the details of construction, form, arrangement and operation without departing from the invention as set forth in the appended claims.

What I claim is:

1. In a lubricating system, the combination with a vehicle, of a tank supported thereon, a conduit communicating with the tank and terminating in a valved discharge orifice adjacent the periphery of the vehicle, and a flexible hose provided with a coupling member adapted for cooperative engagement with said first named coupling, and means in connection with the second coupling for opening said valve when the couplings are operatively engaged.

2. In a lubricating system, the combination with a vehicle, of a tank supported thereon, a plurality of conduits communicating with the tank and terminating in separate valved discharged orifices adjacent the periphery of the vehicle, and a flexible hose provided with a coupling member adapted for cooperative engagement with said first named coupling, and means in connection with the second coupling for opening said valve when the couplings are operatively engaged.

3. In a lubricating system, the combination with a vehicle of a tank supported thereon, a conduit communicating with the tank, and terminating in a coupling member positioned adjacent the periphery of the vehicle, a valve within said coupling member closing by pressure of lubricant in said conduit, and a flexible hose having a coupling adapted to engage either of the first-named couplings, and means in connection with a coupling on the hose for opening the respective valve when said coupling is operatively engaged with either of the first-named couplings.

4. In a lubricating system, the combination with a vehicle of a tank supported thereon, and a plurality of conduits communicating with the tank, each terminating in a coupling positioned adjacent the periphery of the vehicle, separate valves in said couplings closing by pressure of lubricant in said conduits, and a flexible hose having a coupling adapted to engage either of the first-named couplings, and means in connection with a coupling on the hose for opening the respective valves when said coupling is operatively engaged with either of the first named couplings.

5. In a lubricating system, the combination with a vehicle of a lubricant tank supported thereon, a piston movable in said tank, means for producing pressure in said tank upon one side of said piston, an outlet from the opposite side of said piston, a conduit connected to said outlet and terminating adjacent the outer wall of the vehicle and including a coupling member at its termination, a valve in said conduit closed by pressure of the lubricant in the conduit, a flexible hose provided with a coupling adapted for co-operative engagement with the first-named coupling, and means in connection with the second coupling for opening said valve when the couplings are operatively engaged.

6. In a lubricating system, the combination with a vehicle of a lubricant tank supported thereon, a conduit communicating with the tank and terminating adjacent the outer wall of the vehicle, a coupling member connected to the end of said conduit, a normally closed valve for said conduit, a flexible hose provided with a coupling adapted for cooperative engagement with first-named coupling, and means in connection with the second coupling for opening said valve when the couplings are operatively engaged.

7. In a lubricating system, the combination with a vehicle, of a lubricant tank supported thereon, a plurality of conduits communicating with the tank and terminating adjacent different portions of the outer wall of the vehicle, a coupling at the end of each of said conduits, a valve in connection with each conduit, said valves closing in the direction of flow of lubricant through the conduits, and a flexible hose having a coupling adapted to operably engage either of the first-named couplings, and means in connection with the coupling on the hose for opening the respective valve when said coupling is operably engaged with either of the first named couplings.

In witness whereof I have hereunto set my hand this 4th day of May, 1920.

GEORGE W. SEVERSON.

Witnesses:
C. A. BACON,
H. O. CLARK.